(12) United States Patent
Ovshinsky et al.

(10) Patent No.: US 6,210,498 B1
(45) Date of Patent: Apr. 3, 2001

(54) HYDROGEN STORAGE ALLOYS AND METHODS AND IMPROVED NICKEL METAL HYDRIDE ELECTRODES AND BATTERIES USING SAME

(75) Inventors: Stanford R. Ovshinsky, Bloomfield Hills; Rosa T. Young; Benjamin Chao, both of Troy, all of MI (US)

(73) Assignee: Energy Conversion Devices, Inc., Troy, MI (US)

( * ) Notice: Subject to any disclaimer, the term of this patent is extended or adjusted under 35 U.S.C. 154(b) by 0 days.

(21) Appl. No.: 09/064,543

(22) Filed: Apr. 22, 1998

(51) Int. Cl.[7] .................. H01M 4/36; C22B 23/00; C22F 1/10; C22F 3/00
(52) U.S. Cl. .................. 148/555; 148/577; 148/675
(58) Field of Search .................. 419/2; 148/555, 148/577, 675

(56) References Cited

U.S. PATENT DOCUMENTS

| | | | |
|---|---|---|---|
| 4,623,597 | * 11/1986 | Sapru et al. | 429/101 |
| 5,277,999 | * 1/1994 | Ovshinsky et al. | 429/59 |
| 5,554,456 | * 9/1996 | Ovshinsky et al. | 429/59 |
| 5,616,432 | * 4/1997 | Ovshinsky et al. | 429/59 |
| 5,780,180 | * 7/1998 | Okamoto | 429/175 |
| 5,879,429 | * 3/1999 | Yamamura et al. | 75/332 |
| 5,888,317 | * 3/1999 | Lee et al. | 148/424 |
| 5,905,003 | * 5/1999 | Young et al. | 429/223 |
| 6,030,724 | * 2/2000 | Sawa et al. | 429/218.2 |
| 6,048,644 | * 4/2000 | Tsuji et al. | 429/218.2 |

* cited by examiner

Primary Examiner—Daniel J. Jenkins
(74) Attorney, Agent, or Firm—David W. Schumaker; Marvin S. Siskind

(57) ABSTRACT

Reversible hydrogen storage alloys and methods and electrodes formed therefrom for nickel metal hydride batteries, in which the alloys are quenched from a melt at cooling rates selected to provide a high degree of disorder with an optimum local environment.

23 Claims, 10 Drawing Sheets

1: Ti8.4Zr25.3V5.1Ni39.5Cr3.8Mn17.8 &
2: Ti6.7Zr25.3V7.6Ni29.6Cr9.1Mn21.8
3: Ti4.6Zr38.4Ni41.2Cr0.2Mn4.1Sn11.5
4: Ti10.4Zr33.7Ni52.3Cr0.2Mn1.6Sn1.6
5: ZrO2

1: Ti9.4Zr27.1V4.4Ni39.8Cr3.7Mn15.5 &
2: Ti6.9Zr25.1V7.8Ni30.2Cr8.5Mn21.4
3: Ti8.4Zr35.8Ni41.9Mn3.8Sn10.1
4: Ti9.3Zr32.3Ni55.4Mn2.0Sn1.1

Melt Spun Ribbons: $Ti_{8.7}Cr_{26.7}V_{4.8}Ni_{36.9}Cr_{5.6}Mn_{17.4}$

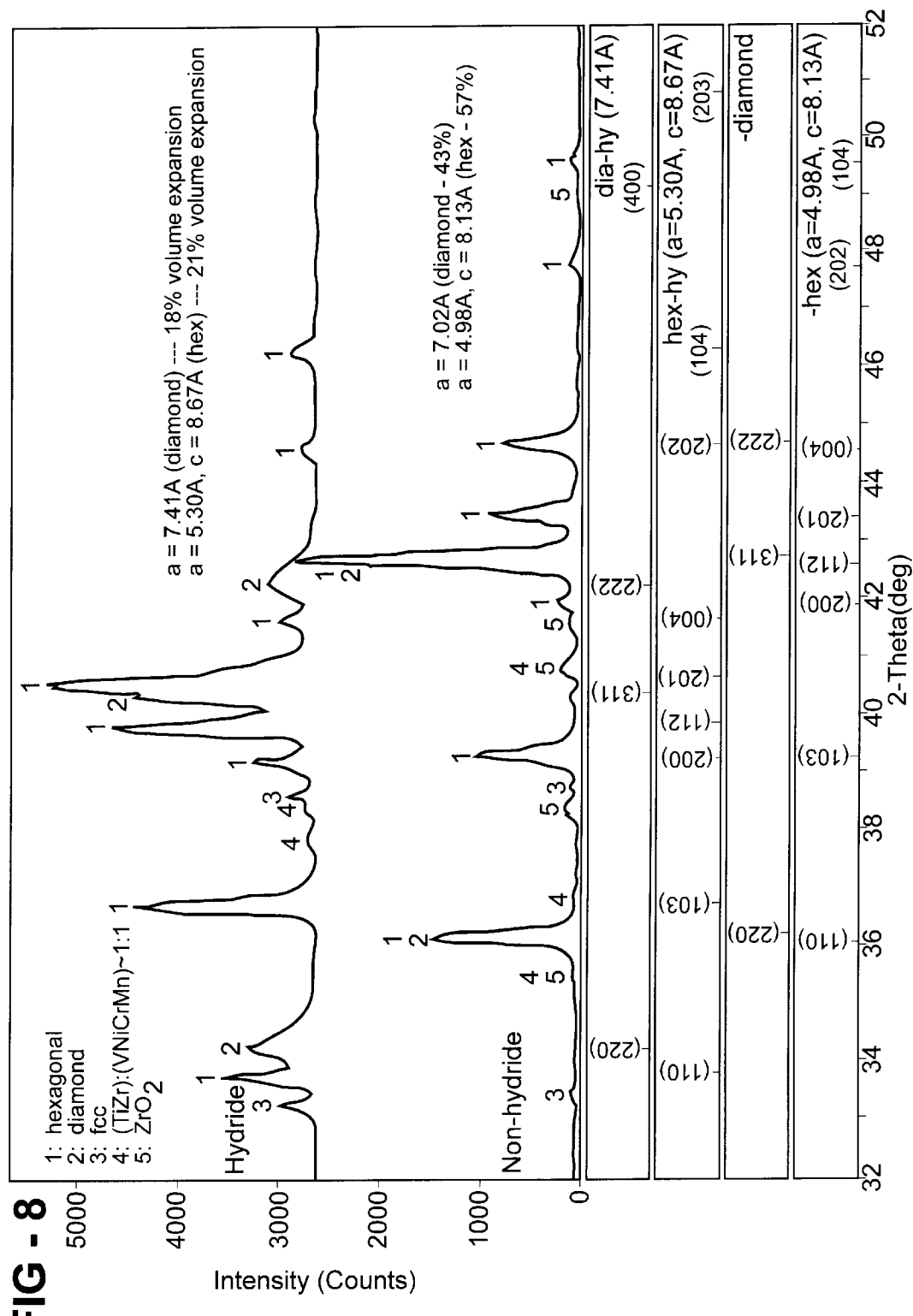

HYDROGEN STORAGE ALLOYS AND METHODS AND IMPROVED NICKEL METAL HYDRIDE ELECTRODES AND BATTERIES USING SAME

FIELD OF THE INVENTION

The present invention relates generally to improved hydrogen storage alloys and improved methods for making such alloys and to improved rechargeable nickel metal hydride (NiMH) electrodes and batteries employing such alloys and methods. More specifically, the instant invention relates to improved hydrogen storage materials which electrochemically store and release hydrogen and which function as the negative electrode materials for NiMH batteries.

BACKGROUND OF THE INVENTION

Rechargeable NiMH batteries have become the batteries of choice for many applications ranging from consumer applications such as laptop computers and cell telephones to large scale applications such as electric vehicle (EV) propulsion and hybrid electric vehicle (HEV) propulsion systems.

For example, Ni—MH batteries, such as those described in copending U.S. patent application Ser. No. 07/934,976 now U.S. Pat. No. 5,277,299 to Ovshinsky and Fetcenko, the disclosure of which is incorporated herein by reference, have high energy and power densities, contain no toxic materials, can be rapidly recharged and have become the batteries of choice for both EV and HEV applications as well as consumer product applications. The fundamental principles of the technology incorporated in such batteries is disclosed in U.S. Pat. No. 4,623,597—Ovshinsky et al.

Some highly efficient electrochemical hydrogen storage materials have been formulated based on the principles set forth in the aforementioned U.S. Pat. No. 4,523,597. The present invention is based on fundamentally new discoveries relating to the compositions, structures, electron concentrations and local order and environment of such hydride materials having particular application as materials for the negative electrodes of NiMH batteries. The new hydride materials of the present invention provide an even higher density of accessible, reversible hydrogen storage sites in a preferred spectrum with superior kinetics and other properties and exhibit substantially improved and superior performance characteristics in NiMH batteries.

SUMMARY OF THE INVENTION

We have discovered that the hydrogen storage and related properties of the hydride materials of the invention are affected by certain parameters which can be controlled as will be disclosed in detail below to attain the desired properties.

One parameter which is relevant to materials which store hydrogen atoms/protons is the electronic environment of the storage sites therefor. Here we discuss hydrogen atoms and protons interchangeably because, as is apparent, a hydrogen ion is a proton, and once the moving proton comes to rest in an thermodynamically/electronically favored position, it becomes a hydrogen atom. Therefore, while the proton itself is physically very small, the electronic influence it has is large, and once it occupies a storage site, it becomes a hydrogen atom, having the characteristic atomic diameter of a hydrogen atom. Therefore, one way in which the storage sites can be increased is to form a more favorable electronic environment for the entering protons.

Increased hydrogen storage can be accomplished by increasing the theoretical number of available storage sites and by increasing the utilization of the theoretical storage sites. Increasing the number of theoretical storage sites involves changing the materials composition and its crystallographic structure. Increasing the utilization of the theoretical storage sites is a somewhat different problem. This problem is the one that involves improving the electronic environment of the storage sites. That is, by selecting the proper atoms (size, electron configuration, outer shell electrons, electronegativity, etc.) one can increase or decrease the electronic/thermodynamic desirability of the theoretically available storage sites, and therefore make these sites more or less likely to actually be favorable to storage of the hydrogen. For instance, if the atoms surrounding the theoretical storage site are too large, or do not have readily available outer shell electrons, etc., then the site will be less favorable for hydrogen storage. However, if the atoms are smaller and there is available electrons to hold the proton, the site will be more favorable for hydrogen storage.

Another aspect of this electronic environment problem is the effect of coulombic repulsion. This occurs when the hydrogen atoms stored in neighboring sites repel the surrounding atoms, which in turn reduces the electronic favorableness of nearby storage sites. That is, as the surrounding atoms are repelled from the previously stored hydrogen, they crowd the unfilled hydrogen storage sites nearby, increasing the coulombic repulsion of any protons attempting to enter the site. Reduction of the size of the neighboring atoms and thus the positive charge of the nucleus thereof, reduces this coulombic repulsion effect.

While the hydrogen storage density of a storage material is an important property thereof, it is not the only consideration. An additional property of interest is the "bond strength" of the stored hydrogen. The term "bond strength" is somewhat misleading in connection with hydrogen storage in that not all hydrogen storage materials "bond" the hydrogen in a conventional sense. Some materials, like magnesium, do bond hydrogen in a conventional sense. That is, the hydrogen forms covalent bonds with magnesium. These covalent bonds hold the hydrogen very strongly and it is therefore very difficult to get the hydrogen back out of the magnesium hydride. Other hydrogen storage alloy systems intercalate the hydrogen into thermodynamically favorable storage sites. These thermodynamically favorable sites, while not "bonds" in the conventional sense, act as such. Typically these intercalation sites have "bond energies" which are of much lower energy than, for instance, a covalent bond. This lower "bond energy" makes these materials more useful for hydrogen storage, in that the hydrogen can more easily be retrieved from the storage material.

While specific elements may form covalent bonds with the stored hydrogen, it is possible to form a spectrum of "bond energies" by adding elements together to form a hydrogen storage alloy. Addition of materials with d-orbital electrons to such an alloy may provide spectrum of "bond energies" required to make the materials useful for hydrogen storage. Additionally elements which contain f-orbital electrons may also be useful. Thus, while an element like magnesium, alone, may form covalent bonds with hydrogen which are hard to break, formation of an alloy by the addition of more elements can create a spectrum of bonding energies, thereby rendering the alloy suitable for "real world" hydrogen storage use. That is, this spectrum of bonding energies creates electronic pathways for utilization of the hydrogen under useful "real world" conditions.

Another property for consideration is the macrostructure of the storage material. By macrostructure we mean the topology/physical structure of the material and the crystallite size/shape. Topology/physical structure relate to the physical form that the material exists in, such as powder, flake, ribbon, plate, ingot, thin-film, etc. This parameter is important in that small particulate or thin ribbons/films allow the hydrogen easier access to the interior of the structure. Thus, there is less external material which could block utilization of the internal material. Additionally, the larger surface area of such a material allows for better access by the electrolyte of the battery. Also, the materials in the exterior of such a material have fewer crystallographic constraints. As for crystallite size, generally a smaller size will be more advantageous because, as with the topology, there will be less outside material which could block utilization of the interior material, and there will be fewer crystallographic limitations on the outer material. For instance the coulombic repulsion of the outer storage sites will be lower because there are fewer surrounding atoms. Thus, by making the crystallites smaller (increasing surface area to volume ratio) we can increase overall storage.

Present hydrogen storage alloys can only store about 7 hydrogen atoms per crystallographic unit cell. While the theoretical maximum number of storage sites is 17 per crystallographic unit cell for an $AB_2$, prior art materials have utilized at maximum only about 7 of these sites per cell. We have found that a hydrogen storage material that stores at least 8 hydrogen atoms per crystallographic unit cell of the storage material can be formed from a plurality of metallic elements, at least two of which have empty d and/or f band electron orbitals. The material has a chemical, electronic and thermodynamic local environment which creates hydrogen storage sites characterized by reduced coulombic repulsion thereof and a spectrum of bond energies therefor.

We have also found that these materials, while preferably lacking long range order, must possess enough short range order to establish local crystalline identities which exert their influence, either singly or together and/or through interaction, to control the properties of the material. It has been found, for example, that these local crystallite structures establish percolation paths for the conduction of charge carriers, such as protons, through the material. We have further determined that these local crystalline structures can also be affected by compositional variations which in turn control electron concentrations. It has been found that different electron concentrations favor the formation of certain types of local crystalline structures and the relative proportions thereof. Further, we have determined the formation of such local crystalline structures and the relative concentrations thereof can be controlled and determined by regulating the cooling or quench rates of the material when it is formed and solidifies from a molten state.

In addition, the preferred materials of one embodiment of the invention are formed of a relatively high concentration of d-band elements which provide a high concentration of empty d-band orbitals (or partially filled d-band shells which provide d-band electrons) which are preferentially oriented to serve as a spectrum of hydrogen storage sites. For NiMH battery applications, the spectrum of hydrogen storage sites is selected to be positioned in the preferred range for electrochemically reversible storage and release of hydrogen during the charge and discharge cycles of the battery. In another embodiment, empty f-band orbitals are added to and/or substituted for some of the empty d-band orbitals by adding small amounts of selected f-band elements.

In still another preferred embodiment, we have found that controlling the cooling rate of the material when it is formed and solidifies from the melt can affect the efficiency at which the hydride forming elements of the material are incorporated into the active matrix of the material. We have thus been able to substantially improve the performance of prior art materials by incorporating into the active matrix of the materials during their formation additional hydride forming elements that remained dormant or in an inactive and/or non-contributing state in the prior art materials. As noted above, we have also found that the cooling or quench rate can be controlled to favor the formation of certain local crystalline structure types and combinations of local crystalline structure types as well as the relative proportions thereof.

We have also discovered that the size of the local crystallite formations should be relatively small, typically on average less than about 1000 nanometers or so and generally in a preferred range of from about 20 nanometers up to about 100 to 300 nanometers, in order to establish and optimize a percolation path for the conduction of protons within the bulk of the material. The size of the local crystallites is preferably controlled, for any given composition, by controlling the quench rate from the melt. Higher quench rates will, in general, produce smaller crystallite sizes. As noted above, however, a certain minimum crystallite size, corresponding to regions of local crystalline order, should be maintained in order to establish local crystalline identities. These aspects of the invention and the further details thereof will be set forth below.

These and other important features and principles of the present invention as well as the materials and methods of the invention and the application thereof to the field of NiMH batteries will be set forth below in the detailed description of the invention provided below.

BRIEF DESCRIPTION OF THE DRAWINGS

FIGS. 8A and 8B are X-ray diffraction patterns for a hydriding material of the present invention showing the presence of both diamond cubic and hexagonal crystalline structures observable when the material is in the hydrided state;

DETAILED DESCRIPTION OF THE INVENTION

Figure 1:
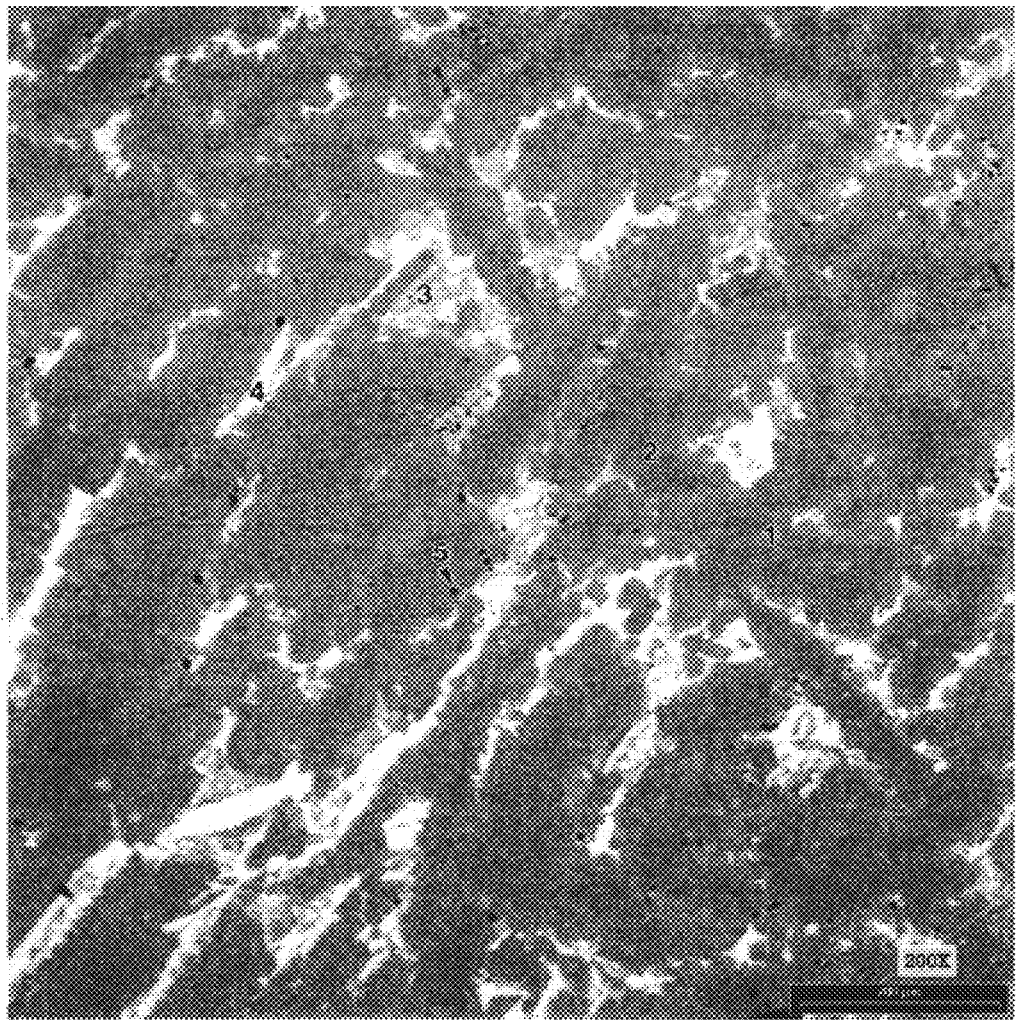
FIG. 1 is a photomicrograph of a cross sectional view of a hydriding material which has been slow cooled from the melt.

Referring now to FIG. 1, there is shown a photomicrograph of a hydride which has been slow cooled from the melt by allowing the material to cool and solidify under ambient conditions. The compositions of the major components as well as the minor components are given in the caption below the photomicrograph and are assigned numerals as noted. The numerals are shown on the photomicrograph to indicate representative locations of the respective components. The major components are those which are the active components of the material, i.e., those which reversibly store and release hydrogen. The minor components are those which are either non-hydriding phases are which are slow hydriding phases that do not contribute materially to the performance of the material. That is, the minor components are essentially inert and are "dead weight" in the material. The volume fractions of the respective components are also given in the captions which identify them. It is noted that the total volume fraction of the minor components is over 14% of the total volume of the material. In other words, the slow cooled material of FIG. 1 contains over 14% by volume of material that does not actively contribute to the function of the material as a hydrogen storing electrode.

Figure 2:
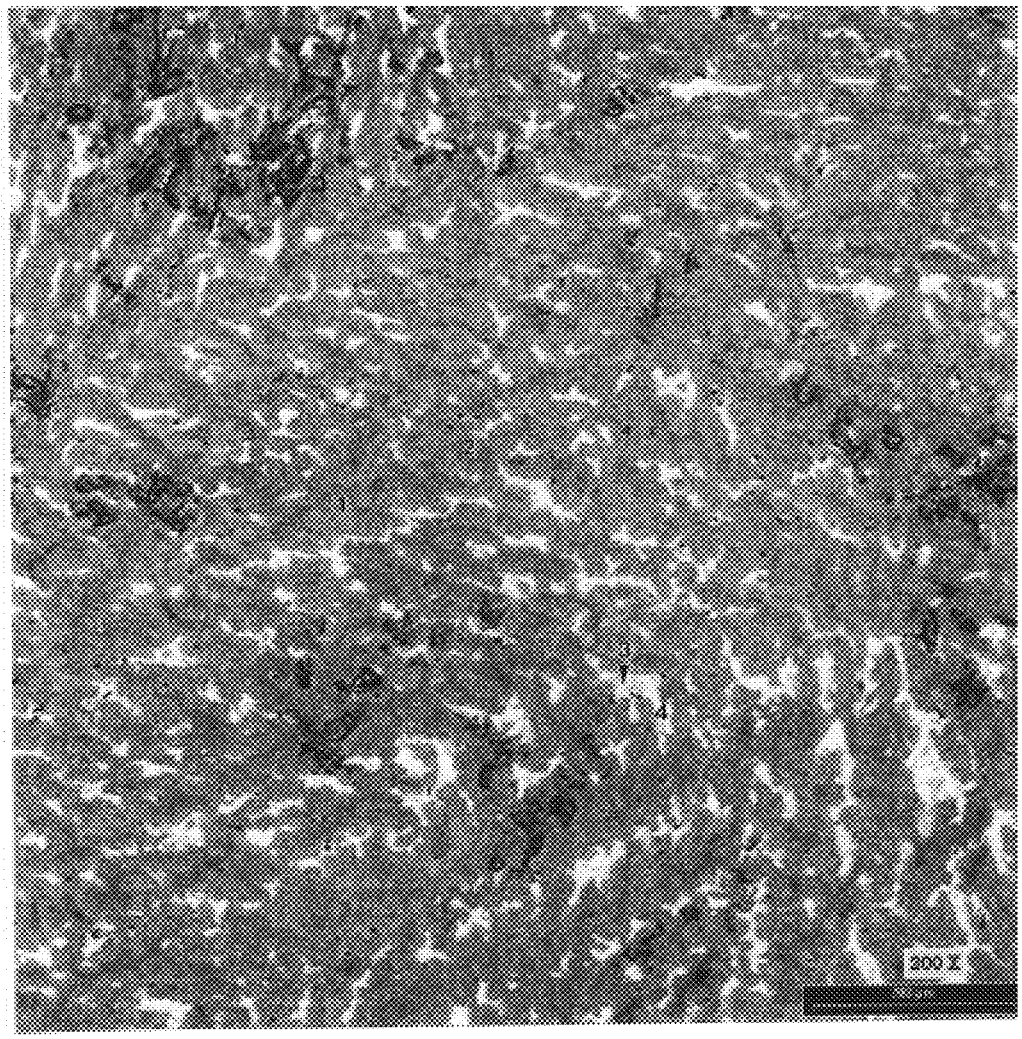
FIG. 2 is a photomicrograph of a cross sectional view of a hydriding material which has been cooled from the melt at a faster cooling rate than the material of FIG. 1.

FIG. 2 shows a photomicrograph of a hydride material that has been cooled under ambient conditions from a smaller volume of melted material and thus has been cooled more rapidly than the material of FIG. 1 because of the smaller volume of material. The major and minor components and the volume fractions thereof are given in the caption as in FIG. 1. It is noted that, for the faster cooled material of FIG. 2, the volume fraction of inactive material of the minor components has been reduced to about 11% by volume as compared to over 14% by volume for the material of FIG. 1. Thus, faster cooling has eliminated and/or reduced some of the minor components but a substantial volume fraction thereof still remains.

Figure 3:
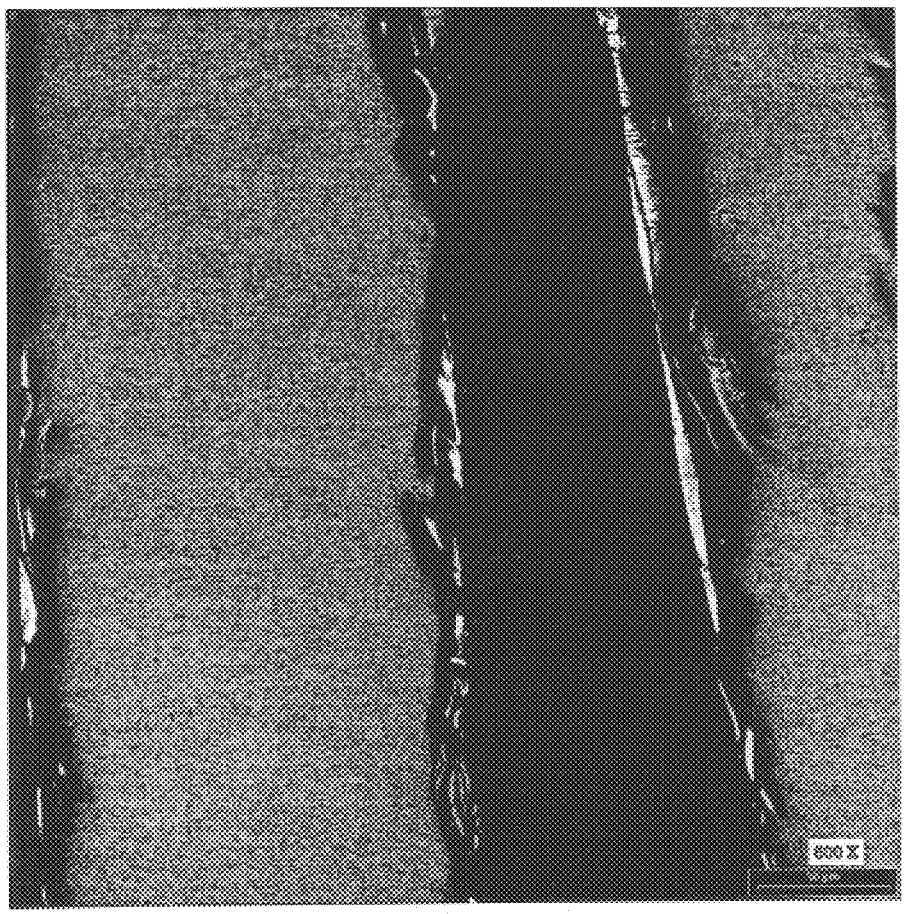
FIG. 3 is a photomicrograph of a cross sectional view of a hydriding material which has been more rapidly cooled from the melt by melt spinning.

FIG. 3 is a photomicrograph of a hydride material that has been rapidly cooled from the melt by melt spinning, that is by ejecting a jet of molten material onto the surface of a rotating wheel or drum that is cooled to maintain a low surface temperature. In the case of the material of FIG. 3, the peripheral surface velocity of the wheel was about 5 meters per second and the quench rate was about $10^4$ to $10^{6\circ}$ C. per second. In this case, there are no detectable amounts of minor components present. That is, all of the material has been incorporated into the active matrix of the material and there is no "dead weight" material present.

We have thus found that, in the case of FIGS. 1 and 2, the slower cooling has allowed the minor components to precipitate out of the active phases as the materials are cooled. In the case of the material of FIG. 3, the high quench rate has caused these components to be captured within the major component and has prevented the precipitation of the minor components during the cooling process. However, as will be set forth below in further detail, the quench rate must not be too high because such excessively high quench rates cause shifting of the desired types of local crystalline structures and their ratios relative to each other with adverse effects on the performance of the material. This aspect of the present invention will now be discussed in further detail.

FIG. 4A shows an X-ray diffraction (XRD) pattern for a hydriding material which has been slow cooled from the melt. FIG. 4B shows an XRD pattern for a hydriding material which has been melt spun at a speed of 5 meters per second, which corresponds to an intermediate quench rate of about $10^4$ to about $10^{5\circ}$ C./s. FIG. 4C shows an XRD pattern for a hydriding material which has been melt spun at a speed of 25 meters per second, corresponding to a relatively high quench rate of greater than about $10^{6\circ}$ C./s. As used herein, a wheel speed of 5 m/s will correspond to a quenching rate of about $10^4$–$10^{5\circ}$ C./s, a wheel speed of 15 m/s corresponds to a quenching rate of about $10^{6\circ}$ C./s, and a wheel speed of 25 m/s corresponds to a quenching rate of greater than $10^{6\circ}$ C./s.

For the slow cooled material of FIG. 4A, the peaks representing the minor components within the material are denoted by the asterisks. These are the non-hydriding and low-hydriding components as shown in the photomicrograph of FIG. 1. The hydrogen storage capability of the material of FIG. 4A is 380 milliampere hours per gram (mAh/g). In the case of the material of FIG. 4B, which has been cooled by melt spinning at a moderate wheel speed of about 5 meters per second, analysis of the pattern indicates that the minor components are no longer present and that the material consists of a mixture of diamond cubic crystalline structure and hexagonal crystalline structure. The hydrogen storage capability of the material of FIG. 4B is about 410–420 mAh/g. Analysis of the pattern of FIG. 4B further indicates that the material is on average about 70% hexagonal crystalline structure and 30% diamond cubic crystalline structure.

In the case of the material of FIG. 4C, which has been melt spun at a substantially higher wheel speed of about 25 meters per second, analysis of the pattern indicates that, while the non-hydriding components are still absent from the material as in the case of FIG. 4B, the structure of the material of FIG. 4C has shifted to about 48% diamond cubic and about 52% hexagonal crystalline structures. The hydrogen storage capability of the material of FIG. 4C has decreased to about 380 mAh/g. Thus, while the material of FIG. 4C has no non-hydriding components present, its hydrogen storage capability is no greater than that of the material of FIG. 4A, which has a substantial volume of non-hydriding components present.

Figure 4:
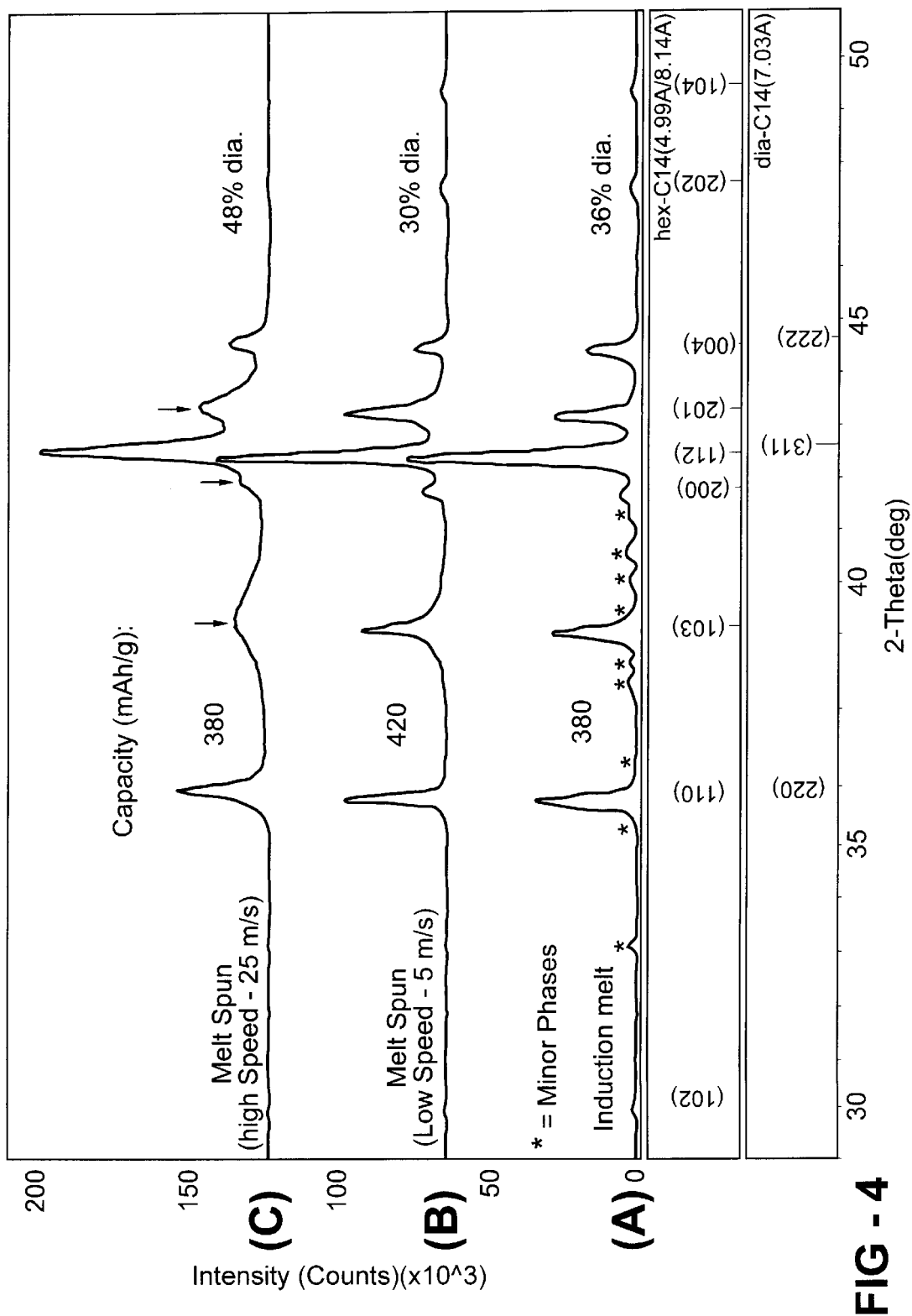
FIGS. 4A through 4C are X-ray diffraction patterns of hydriding materials which have been cooled from the melt at low, intermediate and high cooling rates, respectively.

We have found that the lower hydrogen storage capacity of the melt spun material of FIG. 4C as compared with the melt spun material of FIG. 4B is due to the shift in the local crystalline structure from 30% diamond cubic/70% hexagonal of FIG. 4B to 48% diamond cubic/52% hexagonal of FIG. 4C. We have further found that the shift in crystalline structure is due to the higher quench rate of FIG. 4C. That is, the higher quench rate favors the formation of the diamond cubic crystalline structure over the hexagonal crystalline structure. The substantially higher quench rate of FIG. 4C also causes a much smaller crystallite size. Thus, the sizes of the local crystalline domains of the material of FIG. 4C have been substantially reduced from those of the material of FIG. 4B. Therefore, in the case of the material of FIG. 4C, the sizes of the local crystalline domains have been very substantially reduced and the relative proportions of the local crystalline structures (diamond cubic and hexagonal) have been drastically shifted.

The term "crystalline structure" as used herein refers to and means the basic type of crystalline structure of the lattice, that is whether cubic, hexagonal, rhombic etc., and it does not refer to different compositional phases characterized by different lattice constants that may be present within the given crystalline structure by reason of compositional disorder within that same crystalline structure. In other words, a given type of crystalline structure may have different compositional phases within that structure, such different phases all being of the same basic type of crystalline structure but having different lattice constants.

We have also found that the local crystalline structure, which is necessarily a local crystalline structure in such rapidly cooled materials, is necessary to assure high performance of the material as a reversible hydrogen storage material, particularly for electrochemically controlled reversible reactions for use as electrode material in NiMH batteries. To explain further, as the quench rate in the melt spinning process is increased to produce more rapid cooling from the melt, the higher quench rates favor the formation of smaller and smaller crystallite sizes. At very high quench rates, an amorphous microstructure is approached and the domains of local crystalline order are diminished. to the vanishing point. This causes a reduction in the hydrogen storage capability of the material. Also, the presence of multiple crystalline structures within the material is believed to contribute to the hydrogen storage properties of the material. Thus, as the material is cooled at higher and higher quench rates, such as those applied to the material of FIG. 4C, the ratio of one crystalline structure to the other is very substantially shifted, which also causes a deterioration in the properties of the material.

Further evidence for the interaction of the multiple local crystalline structures is presented below.

Figure 5:
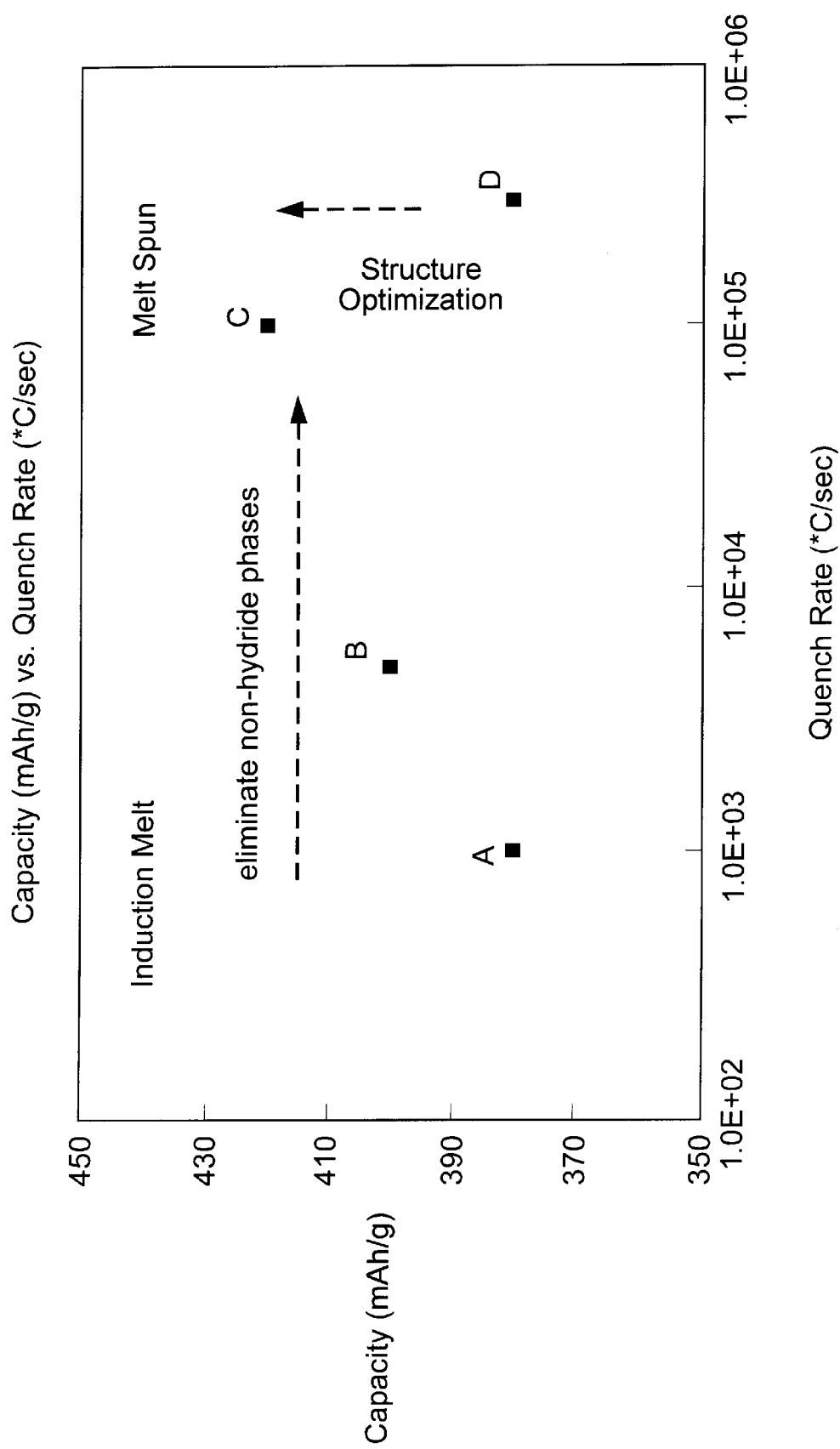
FIG. 5 is a graphical presentation of hydrogen storage capacity of a hydriding material as a function of quench rate.
Figure 6:
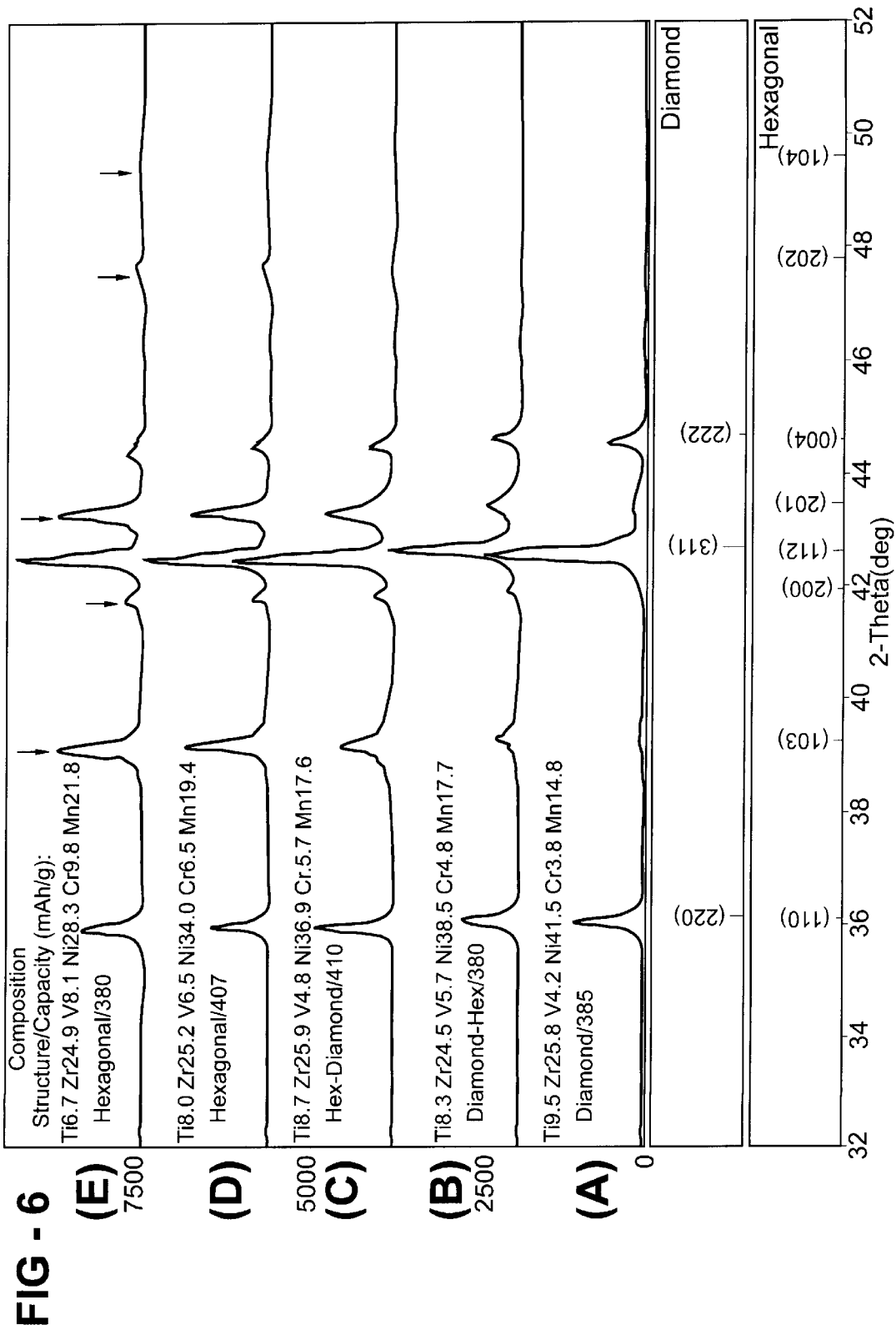
FIGS. 6A through 6E are X-ray diffraction patterns showing the effect on local crystalline structures of hydriding materials as a function of electron concentration attained by compositional variation of the material.

FIG. 5 is a graphical presentation of the data relating to the effect of quench rate on hydrogen storage capacity. In FIG. 5, hydrogen storage capacity is given in mAh/g and the quench rate is given in degrees C per second. That is, the listed quench rate of 1.0E+04, for example, is $10^{4°}$ C. per second. Points A, B and C in Figure represent the first order effect of eliminating the non-hydriding components as has been explained above. Point D shows the second order effect of increasing the diamond cubic structure and reducing the hexagonal structure while, at the same time, reducing the crystallite sizes because of the higher quench rate.

All of the data presented in the above described FIGS. 1 through 5 are based on the same hydriding alloy composition in the melt. The alloys were all melted using an induction melting process.

The inventors have also found that the relative proportions of the different local crystalline structures can be influenced by selecting the elements of the alloys to vary the electron concentration of the material. That is, the inventors have found that the tendency to form the diamond cubic, hexagonal or mixed structure was compositionally dependent. The results of melt quenching several related but different compositions is shown in Table 1. These melts were quenched under the same conditions (i.e. roller speed of about 5 m/s). This effect is also shown in the XRD patterns presented in FIGS. 6A through 6E.

FIG. 6A shows the XRD pattern for the listed composition, which contains 41.6 at. % nickel. The pattern shows nearly a pure diamond cubic structure. The material has a hydrogen storage capacity of about 385 mAh/g. FIG. 6B shows the XRD pattern for a reduced nickel concentration below that of FIG. 6A, which shifts the electron concentration. For the material of FIG. 6B, some hexagonal crystalline structure is seen to be present but the hydrogen storage capacity remains at about 380 mAh/g. FIG. 6C shows the result of a further shift in the electron concentration effected by a further reduction in the nickel concentration. Here the proportion of the hexagonal crystalline has been further increased relative to the diamond cubic structure and the hydrogen storage capacity has been increased to about 410 mAh/g.

The term "electron concentration" of an element means the average number of electrons per atom outside the closed shells of the component atoms. That is, for a transition element, the electron concentration is the number of electrons (s & d electrons) outside of it's inert gas shell. The electron concentration of an alloy is just sum of the elemental electron concentrations times their atomic fraction in the alloy. For example, consider the composition of FIG. 6A which is $Ti_{9.5}Zr_{5.8}V_{4.2}Ni_{41.5}Cr_{3.8}Mn_{14.8}$. The number of s and d electrons outside the inert gas shell for titanium is 4, for zirconium the number is 4, for vanadium 5, for Nickel 10, for Chromium 6, and for Manganese 7. The contribution of nickel to the total electron concentration is therefore the atomic fraction of nickel multiplied by 10, namely: 0.415× 10=4.15. The total electron concentration for this alloy is therefore:

$$(0.095 \times 4)+(0.258 \times 4)+(0.042 \times 5)+(0.415 \times 10)+(0.038 \times 6)+(0.148 \times 7)=6.826$$

The electron concentration, while not dispositive of crystalline structure, gives a first approximation as to what physical structure the final alloy will possess. For example, it is known that for Laves phase type alloys, certain electron concentration numbers will give the material a predominantly hexagonal structure as the material is very slowly cooled from the melt. Other electron concentrations will give the material primarily a diamond cubic structure when slow cooled. Still other electron concentrations will give the material a mixed structure when slow cooled. We have found that, while the electron concentration may be predictive, it is not dispositive. Our studies have shown that a single material, having a given electron concentration, can form a final material having predominantly hexagonal, predominantly diamond cubic, or a mixed structure, depending upon the quench rate from the melt, as discussed herein above with respect to FIGS. 4 and 5.

The nickel concentration is further reduced in each case for the materials of FIGS. 6D and 6E, thereby lowering the electron concentration further in each case. It is observed that the lowering the electron concentration favors the formation of the hexagonal crystalline structure at the expense of the diamond cubic structure. As a result, the hydrogen storage capacity is reduced in each case from the optimum to 380 mAh/g for the material of FIG. 6E.

It is therefore seen that we have discovered that the relative proportions of the local crystalline structures in the hydriding materials of the invention can be controlled by changing the electron concentration through compositional variations as well as by controlling the quench rate during cooling from the melt and that the data show in each case an optimum relative proportion of local crystalline structures can be attained and that when the local crystalline structure is reduced to the vanishing point such that its identity is virtually destroyed by very high quench rates, further reductions in hydrogen storage capacity result.

Figure 7:
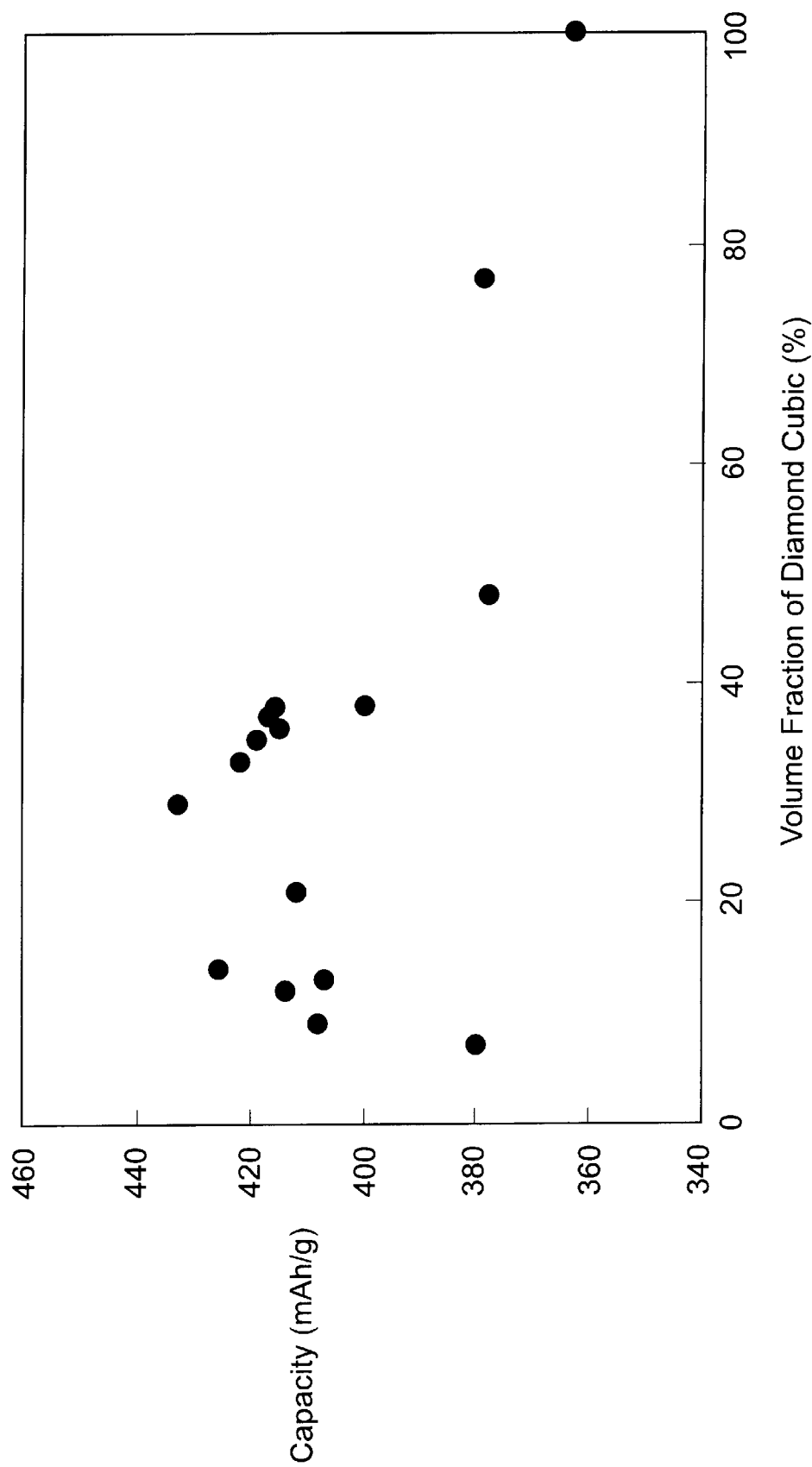
FIG. 7 is a graphical presentation of hydrogen storage capacity of hydriding materials as a function of the relative volume fraction of diamond cubic crystalline structure in relation to hexagonal crystalline structure for hydriding materials cooled by melt spinning at moderate wheel speeds.

FIG. 7 shows hydrogen storage capacity in mAh/g as a function of the volume fraction of the diamond cubic crystalline structure for alloys which include aforementioned materials presented in FIGS. 6A through 6E wherein the relative proportions of diamond cubic and hexagonal structures are controlled by varying the electron concentration. At volume fractions of diamond cubic structure below about 10%, the capacity is greatly diminished. At volume fractions of diamond cubic structure above about 45%, the capacity is also greatly diminished. Optimum performance is obtained in the range of from about 15% to about 45% with the peak in the range of about 20% to 40% diamond cubic.

By way of further explanation of the data and effects presented above, it is believed that the combinations of elements that form the different crystalline structures are present in precursor form in the melt. For very slow cooling rates such as those produced by cooling under ambient conditions, those elements which have a preference for some compositional separation are permitted to precipitate out from the melt as cooling proceeds and the minor non-hydriding components are thus formed. However, when the cooling rate is increased above a critical level and for some range of higher cooling rates beyond that level, the elements and combinations thereof which otherwise would have a tendency to precipitate out from the melt during slow cooling are locked into the active matrix structures of the material and are thus able to contribute to the improved performance of the material.

When the cooling rate is further increased beyond the optimum rate, the optimum local crystalline structure is changed both in terms of the range of its local and intermediate range order and in terms of the optimum balance between interacting different local crystalline structures. Thus, the local crystalline domains are reduced in size and weakened in their effect and the performance is further degraded by upsetting of the optimum of the optimum proportions of the different crystalline structures. In addition, as the structure of the material approaches an amorphous or continuous random network microstructure, the percolation path through the boundary layers structure between the very small crystallites within the material is interrupted, thus interfering with the conduction path established by this percolation path within the material.

While some local crystalline order is thus desirable, the increased disorder accomplished by the higher quench rates of the optimally quenched materials further contributes to hydrogen capacity in addition to effecting incorporation of the non-hydriding components into the active matrix of the material. In the materials of the invention, a high density of empty d-band orbitals is desired since these represent potential hydrogen storage sites. However, since these empty d-band orbitals are directional in nature, not all of these orbitals are aligned for hydrogen bonding. The presence of disorder increases the probability that a higher proportion of these empty d-band orbitals will be available for hydrogen bonding.

Thus, while increasing disorder contributes to improved performance, we have found that the preservation of at least some local crystalline order is essential for optimum performance. In addition, the composition of the materials of the invention is to be selected from the standpoint of electron concentration as explained above to optimize the nature and proportions of local crystalline order for optimum performance. Further details on the present invention are presented below. The hydriding materials of the presence invention preferably contain, in a preferred embodiment, a high concentration of empty d-band orbitals which provide a high concentration of hydrogen storage sites. Since the d-band orbitals must be preferentially oriented to be available as hydrogen storage sites, a high degree of disorder is desirable in order to increase the probability that positional and directional requirements for hydrogen bonding will be met.

For optimum results pursuant to the teachings of the present invention, the speed of the moving surface or quench wheel quenches the material at a speed of between about 5 and 15 m/s. The quench rate or cooling rate is preferably between $10^4$ and $10^{6°}$ C. per second and more preferably between $10^4$ and $10^{5°}$ C. per second. In one embodiment of the invention, the alloy preferably has a nominal composition of 0–20% Ti, 20–35% Zr, 1–15% V, 20–45% Ni, 3–10% Cr, 0–10% Co, 0–5% Fe, 0–5% Cu, 0–5% Sn, 0–5% Al and 14–25% Mn where the percentages are in atomic percent. The non-hydrogen-storage or low-hydrogen-storage capacity compositional or crystallographic phases which are eliminated from such an alloy are typically $ZrO_2$, the fcc and the (TiZr):(VNiCrMn)~1:1 phase. The high-hydrogen-storage-capacity compositional or crystallographic phases are preferably the hexagonal and/or diamond cubic Laves structures, with a mixture of the structures in an optimum range with respect to each other being preferred.

Another way in which the inventors determined that the hexagonal and diamond cubic Laves structures are the ones that stores hydrogen was to look at conventional materials which have been hydrided and crushed and then dehydrided. The inventors noted that there were different particle sizes. They separated the material that had a particle size less than 38 microns from the rest. Then they ground the remaining material and again removed the material that was less than 38 microns.

Analysis of the fraction of the material less than 38 microns revealed that the hexagonal and diamond cubic Laves structures predominate this material. The inventors conclude that the large expansion of the hexagonal and diamond cubic structures upon hydriding causes the material to fracture, and a portion of the material breaks up into small particles on it's own because of these fractures. The additional grinding caused the material to further break along the fracture lines.

We have found that the preferred compositions of the present invention should contain a high density of empty d-band orbitals and that, while having local crystalline order as explained above, should also posses a high degree of disorder. The concentration of empty d-band elements provides a high density of hydrogen storage sites and the high degree of disorder provides a range of orbital orientations which assure the proper directional orientation of the d-band storage sites to accommodate reversible hydrogen storage. The high density of empty d-band orbitals is preferably provided by transition metal elements.

In another embodiment, we add some empty f-band orbitals to serve as hydrogen storage sites. These may be provided by adding rare earth elements. These may be substituted for other elements and are preferably in addition to the d-band elements.

In deriving the data presented herein, the inventors looked at alloys made by an ingot forming process. The alloys have a nominal composition of 0–20% Ti, 20–35% Zr, 1–15% V, 20–45% Ni, 3–10% Cr, 0–10% Co, 0–5% Fe, 0–5% Cu, 0–5% Sn, 0–5% Al and 14–25% Mn where the percentages are in atomic percent. Analysis of the as-produced material showed the presence of five XRD structures: 1) hexagonal, 2) diamond cubic, 3) face centered cubic (fcc), 4) $ZrO_2$, and 5) a (TiZr)(VNiCrMn)~1:1 structures/components. The hexagonal and diamond cubic Laves structures have been determined as the major hydrogen storage structural components in the material, while the fcc does not store hydrogen to any appreciable extent.

One way in which the inventors determined that the local hexagonal and diamond cubic crystalline structures were the storage components was to hydride the alloys. It was noted that the lattice parameters (a, b and c) of the hexagonal structure expanded by an average of about 6.5%. The "a" and "b" lattice parameter changed from about 4.99 Å to about 5.30 Å and the "c" parameter changed from 8.14 Å to 8.67 Å. This lattice increase corresponds to a 21% volumetric expansion of the hexagonal structure in the hydrided state versus the virgin state. Also, the lattice parameters of the diamond cubic structure underwent similar expansion. That is the "a", "b" and "c" parameters all went from about 7.03 Å in the non-hydride state to about 7.36 Å in the hydride state corresponding to a 15% volumetric expansion of the diamond cubic lattice.

The inventors have not determined if the (TiZr):(VNiCrMn)~1:1 component can store hydrogen at all. There is presently no data which is conclusive on this issue. However, it is clear that this is not a major storage component, if it indeed can store hydrogen at all.

The inventors have discovered that the face centered cubic (fcc) structure does not store hydrogen. This can be determined by comparing the XRD peaks of the fcc structure in the hydrided and non-hydrided states. These peaks show no lattice expansion of the fcc structure (i.e. no lattice shifting of the XRD peaks of the fcc structure) and therefore it can be concluded that no detectable amount of hydrogen is stored by the fcc structure.

The $ZrO_2$ component is an impurity which does not store hydrogen and most likely comes from two sources. These sources are: 1) a contaminant in the raw materials, and 2) a side product of the conventional melt process. Later work with melt spun alloys (described hereinbelow) shows that it is more likely a product of the conventional melting/casting process.

FIGS. 8A through 8B show the different components that are formed from the induction melting/casting process, and additionally shows the changes in the material upon hydriding. The lattice change in the hexagonal and diamond cubic structures can be seen from these figures. It should be noted that in the non-hydrided state the hexagonal structural peaks and the diamond cubic structural peaks overlap. This is why some peaks are indicated by both reference numerals 1 and 2 on the non-hydride plot of FIG. 8A. However, because of the different lattice expansion of the hexagonal and diamond cubic structures upon hydriding, the XRD peaks of the hydrided hexagonal and diamond cubic structures no longer overlap and the hydrided hexagonal structure is indicated by reference numeral 1 in of the hydrided plot of FIG. 8B, while the hydrided diamond cubic XRD peak is indicated by reference numeral 2 on the hydride plot of FIG. 8B.

Melt-spinning is known in the art as a means of forming alloy materials. A number of known melt-spinning/quenching techniques are described herein below.

Figure 9A:
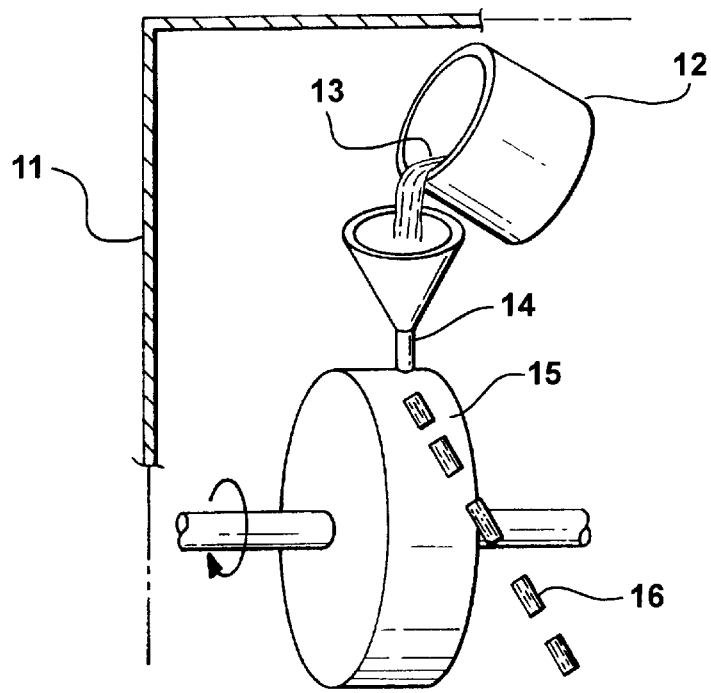
FIG. 9A shows a first apparatus useful in performing the method of the instant invention and producing the hydrogen-absorbing alloy of the instant invention, specifically the apparatus is a single roller melt quenching apparatus.

FIG. 9A shows a hydrogen-absorbing alloy manufacturing apparatus using a single quench wheel or roller. This manufacturing apparatus comprises a cooling roll 15 composed of copper, nickel or the like excellent in thermal conductivity and a molten metal injection nozzle 14 for injecting a molten hydrogen-absorbing alloy 13 supplied from a ladle 12 to the traveling surface of the cooling roll 15 after storing the same. The cooling roll 15 and the like are accommodated in a cooling chamber 11 adjusted to vacuum or an inert gas atmosphere.

In the apparatus shown in FIG. 9A, when the molten hydrogen-absorbing alloy 13 supplied from the ladle 12 is injected onto the traveling surface of the cooling roll 15 through the molten metal injection nozzle 14, the molten alloy is solidified from the surface thereof in contact with the cooling roll 15, crystals begin to be grown and the solidification of the molten metal is generally completed before it leaves from the cooling roll 15. Thereafter, the quenched alloy is further cooled as it flies through cooling chamber 11 and is finally collected as a solid hydrogen-absorbing alloy 16. The preferred cooling rates are in the range of between about $10^4$ to $10^{6°}$ C. per second and more preferably between $10^4$ and $10^{5°}$ C. per second.

Figure 9B:
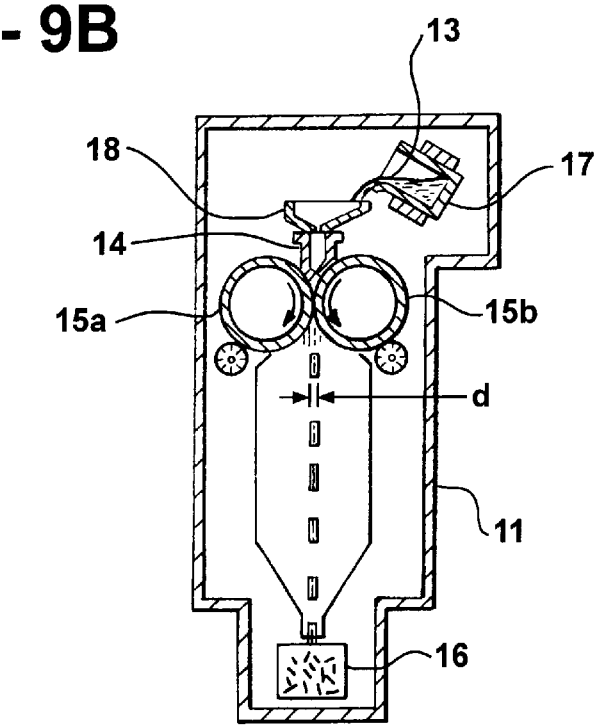
FIG. 9B shows another apparatus useful in performing the method of the instant invention and producing the hydrogen-absorbing alloy of the instant invention, specifically the apparatus is a multiple roller melt quenching apparatus.

FIG. 9B shows a hydrogen-absorbing alloy manufacturing apparatus using multiple rollers. This manufacturing apparatus comprises a pair or more of cooling rolls 15a, 15b disposed in a cooling chamber 11 so that the respective cooling surfaces thereof face each other. A melting furnace 17 is used for preparing a molten hydrogen-absorbing alloy 13. The molten metal passes through a molten metal injection nozzle 14 for injecting the molten hydrogen-absorbing alloy 13 supplied from the melting furnace 17 between the cooling rolls 15a, 15b through a tundish 18.

The cooling rolls 15a, 15b are composed of a good thermal conductor such as copper, nickel or the like. These cooling rolls 15a, 15b are rotated at high speed while keeping a fine gap "d" therebetween. Although the cooling surfaces of the cooling rolls are shown parallel to each other in FIG. 9B, a roll in which the cross section of the cooling surface thereof is formed into a U-shape or V-shape may be employed.

In the aforesaid manufacturing apparatus shown in FIG. 9B, when the molten hydrogen-absorbing alloy 13 is injected in the direction between the cooling rolls 15a, 15b from the injection nozzle 14, it is solidified from the sides thereof in contact with the cooling roll 15a, 15b on the both sides, crystals begin to be grown and the solidification of the molten metal is generally completed before it leaves from the cooling rolls 15a, 15b. Then it flies through cooling chamber 11 and is finally collected as a solid hydrogen-absorbing alloy 16. Once again the preferred cooling rates are in the range of between about $10^4$ to $10^{6°}$ C. per second and more preferably between $10^4$ and $10^{5°}$ C. per second.

This two roller apparatus may be more advantageous for use in forming the alloys of the instant invention. This is because, as will be discussed herein below, the alloy materials formed on the single roller system show a trace of unwanted components and/or structures on the side of the ribbon which faces away from the wheel, i.e. the "air side". Therefore, when two rollers are used, there will be no "air side" and consequently no formation of these trace amounts of the undesirable materials.

Figure 9C:
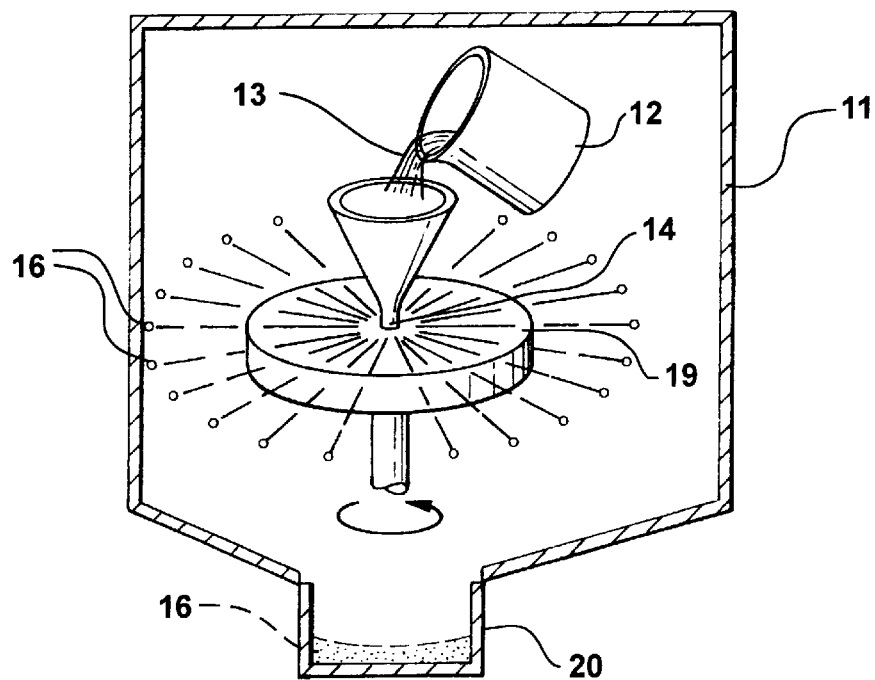
FIG. 9C shows yet another apparatus useful in performing the method of the instant invention and producing the hydrogen-absorbing alloy of the instant invention, specifically the apparatus is a rotating disc melt quenching apparatus.

FIG. 9C shows a hydrogen-absorbing alloy particles manufacturing apparatus which employs a rotating disc as the cooling surface. This apparatus comprises a rotary disc member 19 disposed in a cooling chamber 11. The atmosphere of the chamber 11 is typically an argon gas atmosphere. A molten metal injection nozzle 14 temporarily stores the molten hydrogen-absorbing alloy supplied from a ladle 12 and injects the alloy 13 onto the traveling surface of the rotary disc member 19. The rotary member 19 is composed of a a ceramic or metal material which has a relatively low wetting property to the molten alloy, thereby preventing the molten hydrogen-absorbing alloy 13 from adhering to and solidifying on the rotary member 19.

When the molten hydrogen-absorbing alloy 13 supplied from the ladle 12 is injected onto the traveling surface of the rotary disc member 19 from the molten metal injection nozzle 14, it is finely dispersed by the rotary force and forms spheroids due to it's surface tension. The molten spheroids fly through the cooling chamber 11 without coming into contact with the inner surface of the cooling chamber 11 and are further cooled and solidified by the argon gas atmosphere. As a result, hydrogen-absorbing alloy particles 16 each having a spherical shape and covered with a free cooling surface are formed. The alloy particles 16 are collected into a particle collection vessel 20 disposed on the bottom of cooling chamber 11. As with the roll type apparatus discussed above, the preferred cooling rates for the disk type apparatus are in the range of between about $10^4$ to $10^{6°}$ C. per second and more preferably between $10^4$ and $10^{5°}$ C. per second.

Figure 9D:
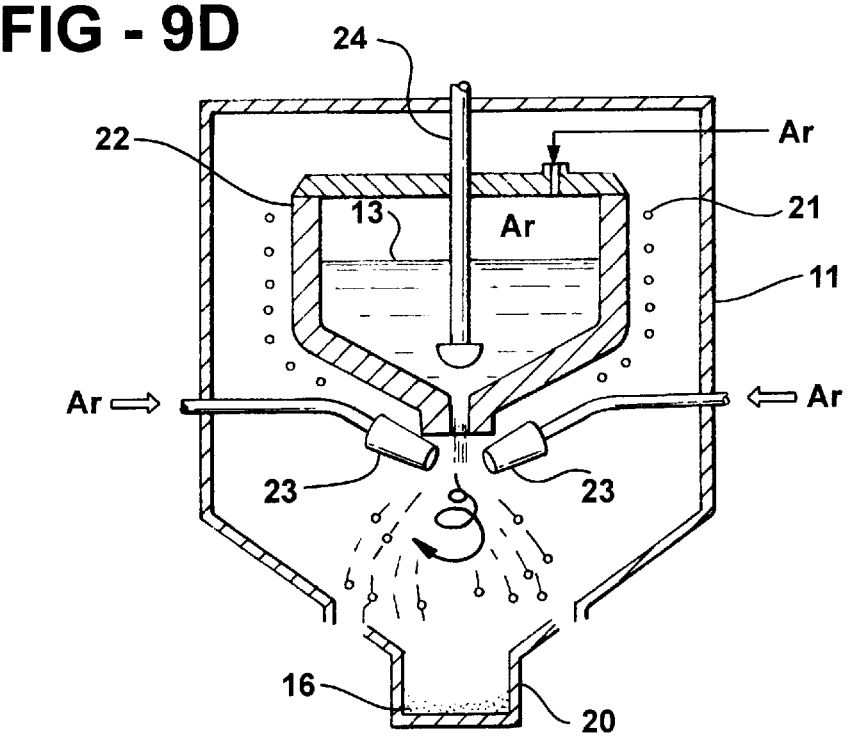
FIG. 9D shows still another apparatus useful in performing the method of the instant invention and producing the hydrogen-absorbing alloy of the instant invention, specifically the apparatus is an alloy particle manufacturing apparatus employing using gas atomization.

FIG. 9D shows a hydrogen-absorbing alloy particle manufacturing apparatus using a gas atomization method. This apparatus comprises a melting furnace 22 for heating and melting the metal alloy material. The furnace 22 is disposed in a cooling chamber 11 into which an argon gas atmosphere has been supplied. A heater 21 melts the hydrogen-absorbing alloy 13 in the furnace 22. A molten metal injection nozzle 14 formed on the bottom of the melting furnace 22 injects the molten metal into the argon atmosphere of the chamber. A plurality of inert gas nozzles 23 disposed in the vicinity of the lower end opening of the molten metal injection nozzle 14 inject a cooling inert gas such as an argon gas or the like at high velocity against the molten metal as it falls in the cooling chamber 11. A shut-off valve 24 is used to open and close the molten metal injection-nozzle 14.

When the argon gas is supplied to melting furnace 22, the liquid surface of the molten alloy 13 in the melting furnace 22 is pressurized and the molten alloy 13 is injected from the opening of the molten metal nozzle 14 on the bottom of the melting furnace 22. Once the molten alloy exits the nozzle 14, inert gas nozzles 23, which are disposed substantially perpendicularly to the direction in which the molten alloy 13 flow, inject inert gas such as argon or the like toward the molten alloy at a high speed. This high speed gas atomizes and disperses the molten alloy 13 in the cooling chamber 11 without causing the atomized droplets to come into contact with the inner wall thereof. The droplets are quenched and solidified while flowing downward along the revolving flow of the inert gas. As a result, hydrogen-absorbing alloy particles 16 each having a spherical shape covered with a free cooling surface are formed and collected into a particle collection vessel 20 disposed on the bottom of the cooling chamber 11. The molten material is atomized into molten droplets ranging in size from about 1–100 μm. The solidified material is collected and further processed into electrode form. The solidified material is spherical in shape and of an optimum size range (1–100 μm) for accommodating efficient processing into electrode material. As in the case of melt spinning apparatus disclosed above, the preferred cooling rates are in the range of between about $10^4$ to $10^{6°}$ C. per second and more preferably between $10^4$ and $10^{5°}$ C. per second.

As discussed above, the instant inventors have discovered that properly controlled melt spinning could produce hexagonal and diamond cubic storage structures in the final material. However, it was noted by the inventors that thick ribbons made by melt spinning had traces of the other compositional components/structures (impurities) which formed on the air side of the ribbon. These trace "impurities" can be removed by spinning thinner ribbons to reduce or eliminate the air side effect or by using a dual roller melt spinning apparatus so that the ribbon has no air side.

While the invention has been described with reference to particular exemplifications and embodiments thereof, it is not intended to be limited to the exemplification and embodiments described. Rather, it is the claims appended hereto and all reasonable equivalents thereof which define the true scope of the present invention.

TABLE 1

| | Sample # | | | | | | | | | |
|---|---|---|---|---|---|---|---|---|---|---|
| | S139x173 | | S139x192 | | S139x189 | | S139x202 | | S139-326 | MF139 |
| Composition | Nom | ICP | Nom | ICP | Nom | ICP | Nom | ICP | Nom | ICP | Nominal |
| Ti | 9.8 | 9.5 | 8.3 | 8.3 | 8.0 | 8.0 | 6.6 | 6.7 | 8.7 | 8.7 | 9.0 |
| Zr | 27.0 | 25.8 | 25.9 | 24.5 | 26.5 | 25.2 | 26.5 | 24.9 | 26.7 | 25.9 | 27.0 |
| V | 4.2 | 4.2 | 5.6 | 5.7 | 6.5 | 6.5 | 7.9 | 8.1 | 4.8 | 4.8 | 5.0 |
| Ni | 41.0 | 41.5 | 38.0 | 38.5 | 33.1 | 34 | 28.0 | 28.3 | 37.4 | 36.9 | 38.0 |
| Cr | 3.8 | 3.8 | 4.7 | 4.8 | 6.5 | 6.5 | 9.8 | 9.8 | 5.6 | 5.7 | 5.0 |
| Mn | 14.5 | 14.8 | 17.5 | 17.7 | 19.0 | 19.4 | 21.2 | 21.8 | 17.4 | 17.6 | 16.0 |
| Fe | 0.0 | 0.1 | 0.0 | 0.1 | 0.0 | 0.1 | 0.0 | 0.1 | 0.0 | 0.1 | 0.0 |
| Sn | 0.0 | 0.3 | 0.0 | 0.3 | 0.0 | 0.3 | 0.0 | 0.3 | 0.0 | 0.3 | 0.0 |
| Al | 0.0 | — | 0.0 | — | 0.0 | — | 0.0 | — | 0.0 | — | 0.0 |
| Vol. % Dia. Cubic | 77 | | 48 | | 9 | | 7 | | 36 | | 43 |
| Capacity (mAh/g) | 379 | | 378 | | 407 | | 380 | | 410 | | 380 |

We claim:

1. A hydrogen storage alloy for a nickel metal hydride battery electrodes for electrochemically and reversibly storing and releasing hydrogen, said alloy being formed by quenching from the melt at a quench rate of from between about $10^4$ to about $10^{6°}$ C. per second, said hydrogen storage material containing at least 10% diamond cubic crystalline structure.

2. A hydrogen storage alloy as set forth in claim 1 where the quench rate is from between about $10^4$ to about $10^{5°}$ C. per second.

3. A hydrogen storage alloy for a nickel metal hydride battery electrode for electrochemically and reversibly storing and releasing hydrogen, said alloy being formed by quenching from the melt at a quench rate of from between about $10^4$ to about $10^{6°}$ C. per second, said alloy being formed primarily of microcrystallites in the size range of from about 20 to about 1,000 nanometers, said hydrogen storage material containing at least 10% diamond cubic crystalline structure.

4. A hydrogen storage alloy as set forth in claim 3 where the size range of the crystallites is from about 20 to about 200 nanometers.

5. A hydrogen storage alloy as set forth in claim 4 where the quench rate is between about $10^4$ to about $10^{5°}$ C. per second.

6. A hydrogen storage alloy as set forth in claim 3 wherein said alloy consists essentially of microcrystallites having a hexagonal crystalline structure and crystallites having a diamond cubic crystalline structure.

7. A hydrogen storage alloy as set forth in claim 3 wherein the volume fraction of microcrystallites having a diamond cubic crystalline structure is from about 15% to about 45%.

8. A hydrogen storage alloy as set forth in claim 7 wherein the volume fraction of microcrystallites having a hexagonal crystalline structure is from about 20% to about 40%.

9. A hydrogen storage alloy as set forth in claim 8 wherein the volume fraction of microcrystallites having a diamond cubic crystalline structure is about 30%.

10. A hydrogen storage alloy material consists essentially of no non-storage compositional components or crystallographic structures and consisting essentially of high-hydrogen-storage-capacity compositional components or crystallographic structures.

11. The hydrogen storage alloy material of claim 10, wherein said alloy has a nominal composition of 0–20% Ti, 20–35% Zr, 1–15% V, 20–45% Ni, 3–10% Cr, 0–10% Co, 0–5% Fe, 0–5% Cu, 0–5% Sn, 0–5% Al and 14–25% Mn wherein said percentages are in atomic percent.

12. The hydrogen storage alloy material of claim 11, wherein said high-hydrogen-storage-capacity compositional components or crystallographic structures comprises mixed hexagonal and diamond cubic Laves structures.

13. The hydrogen storage alloy material of claim 12, wherein said high-hydrogen-storage-capacity compositional components or crystallographic structures comprises between 10% and 45% by volume diamond cubic structure and the remainder consisting essentially of hexagonal structure.

14. The hydrogen storage alloy material of claim 13, wherein said high-hydrogen-storage-capacity compositional components or crystallographic structures comprises between 15% and 45% by volume diamond cubic structure and the remainder consisting essentially of hexagonal structure.

15. The hydrogen storage alloy material of claim 14, wherein said high-hydrogen-storage-capacity compositional components or crystallographic structures comprises about 30% by volume diamond cubic structure and the remainder consisting essentially of hexagonal structure.

16. The hydrogen storage alloy material of claim 10, wherein said high-hydrogen-storage-capacity compositional components or crystallographic structures are formed by rapidly quenching said alloy from a melt.

17. The hydrogen storage alloy material of claim 16, wherein said rapid quenching of said alloy melt is performed at a rate of about $10^4$ to about $10^{6°}$ C./s.

18. A method of eliminating the non-storage compositional and crystallographic structures from a melt-quenched hydrogen storage alloy, said method comprising the steps of:

preparing a melt of an alloy having a nominal composition in atomic percent of 0–20% Ti. 20–35% Zr, 1–15% V, 20–45% Ni, 3–10% Cr, 0–10% Co, 0–5% Fe, 0–5% Cu, 0–5% Sn, 0–5% Al and 14–25% Mn;

directing a thin molten steam of said melt onto a moving chilled surface or quench wheel;

quenching said thin molten stream on said moving chilled surface or quench wheel; and controlling at least one of the flow rate and temperature of said thin stream, the speed and temperature of said moving chilled surface or quench wheel and the composition of the melt such that substantially only high-hydrogen-storage-capacity compositional components or crystallographic structures are formed in the quenched material.

19. The method of claim 18, wherein the non-hydrogen-storage or low-hydrogen-storage compositional components or crystallographic structures which are eliminated from said quenched material are $ZrO_2$, and the face centered cubic structure, and the (TiZr):(VNiCrMn)~1:1 component.

20. The method of claim 18, wherein said high-hydrogen-storage-capacity compositional components or crystallographic structures comprises mixed hexagonal and diamond cubic structures.

21. The method of claim 20, wherein said high-hydrogen-storage-capacity compositional components or crystallographic structures comprises between 10% and 45% by volume diamond cubic structure and the remainder consisting essentially of hexagonal structure.

22. The method of claim 21, wherein said high-hydrogen-storage-capacity compositional components or crystallographic structures comprises between 15% and 45% by volume diamond cubic structure and the remainder consisting essentially of hexagonal structure.

23. The method of claim 22, wherein said high-hydrogen-storage-capacity compositional components or crystallographic structures comprises about 30% by volume diamond cubic structure and the remainder consisting essentially of hexagonal structure.

* * * * *